(12) United States Patent
Grayson et al.

(10) Patent No.: US 7,941,140 B2
(45) Date of Patent: May 10, 2011

(54) UMA/GAN INTEGRATION WITHIN A LEGACY LOCATION BASED SYSTEM

(75) Inventors: Mark Grayson, Maidenhead (GB); Kevin Shatzkamer, New York, NY (US)

(73) Assignee: Cisco Technology, Inc., San Jose, CA (US)

( * ) Notice: Subject to any disclaimer, the term of this patent is extended or adjusted under 35 U.S.C. 154(b) by 505 days.

(21) Appl. No.: 11/543,893

(22) Filed: Oct. 4, 2006

(65) Prior Publication Data
US 2008/0085725 A1 Apr. 10, 2008

(51) Int. Cl.
*H04W 4/00* (2009.01)
(52) U.S. Cl. .............. 455/432.1; 455/435; 455/433
(58) Field of Classification Search .......... 455/432, 455/433
See application file for complete search history.

(56) References Cited

U.S. PATENT DOCUMENTS

| | | | |
|---|---|---|---|
| 2003/0143997 A1* | 7/2003 | Sawada et al. | 455/432 |
| 2006/0172732 A1* | 8/2006 | Nylander et al. | 455/433 |
| 2006/0268902 A1* | 11/2006 | Bonner | 370/401 |

OTHER PUBLICATIONS

3GPP TS 23.271 v4.13.0(Dec. 2004) Technical Specification; 3rd Generation Partnership Project; Technical Specification Group Services and System Aspects; Functional stage 2 description of location services (LCS) (Release 4).
3GPP TS 44.318 v6.5.0 (Jun. 2006) Technical Specification; 3rd Generation Partnership Proect; Technical Specification Group GSM/EDGE Radio Access Network; Generic Access (GA) to the A/Gb interface; Mobile GA interface layer 3 specification (Release 6).

* cited by examiner

*Primary Examiner* — Charles N Appiah
*Assistant Examiner* — Natasha Cosme
(74) *Attorney, Agent, or Firm* — Patent Capital Group

(57) ABSTRACT

In one embodiment, techniques for authorizing a mobile device are provided. A registration request is received for the mobile device. The registration request may include location identifier information. For example, a cell ID may be provided. Static location information is then determined based on the location identifier information. The static location information may be spatial coordinates. The registration request is then authorized based on the static location information. For example, a cell ID may be received and then spatial coordinates may be determined based on the cell ID. The registration request is then authorized based on the spatial coordinates. A response to the registration request is then sent.

20 Claims, 4 Drawing Sheets

UMA/GAN INTEGRATION WITHIN A LEGACY LOCATION BASED SYSTEM

BACKGROUND

Embodiments of the present invention generally relate to telecommunications and more specifically to using location information for authorizing a mobile device.

In a generic access network (GAN)/unlicensed mobile access (UMA) network, mobile devices may access services through a wide area network (WAN), such as a cellular network, and/or a local area network (LAN), such as a WiFi network connected to the public Internet. The GAN/UMA network allows a mobile device to transition between the LANs and WANs seamlessly. When a mobile device attempts to register to the network, the mobile device needs to be authorized to determine if it can access the network.

Problems exist in determining how to authorize the mobile device. If a media access control (MAC) address of the point of attachment is used, the geographical location of the mobile device may be difficult to determine, for example if the point of attachment is portable. Thus, a mobile device may roam to different locations and attempt to connect to networks it may not be authorized to connect to. However, any geographical restrictions on the mobile device cannot be determined based on the MAC address of the point of attachment. Another method may use the internet protocol (IP) address. However, the IP address may only give location information to the city or country level. Additionally, multiple layers of Network Address Translation (NAT) may exist between the mobile end user and the cellular network, in which case the IP address received at the cellular network may not be indicative of the end user location. A finer resolution of where the mobile device is connected is not given. A cell ID for a cellular network may be used or other equipment-specific identifiers may be used. However, the cell ID may change and is dependent on a cellular network provider to set. Accordingly, an authorization database based on the cell ID may have to be continually changed as network providers change, expand, or add cell IDs. Continually changing the authorization database may not be realistic with the number of cell IDs that may change. Additionally, as network providers build out networks, continually adding cell IDs to the authorization database is not desirable.

DESCRIPTION OF EXAMPLE EMBODIMENTS

In one embodiment, techniques for authorizing a mobile device are provided. A registration request is received for the mobile device. The registration request may include location identifier information. For example, a cell ID may be provided. Static location information is then determined based on the location identifier information. The static location information may be spatial coordinates. The registration request is then authorized based on the static location information. For example, a cell ID may be received and then spatial coordinates may be determined based on the cell ID. The registration request is then authorized based on the spatial coordinates. A response to the registration request is then sent.

Figure 1:
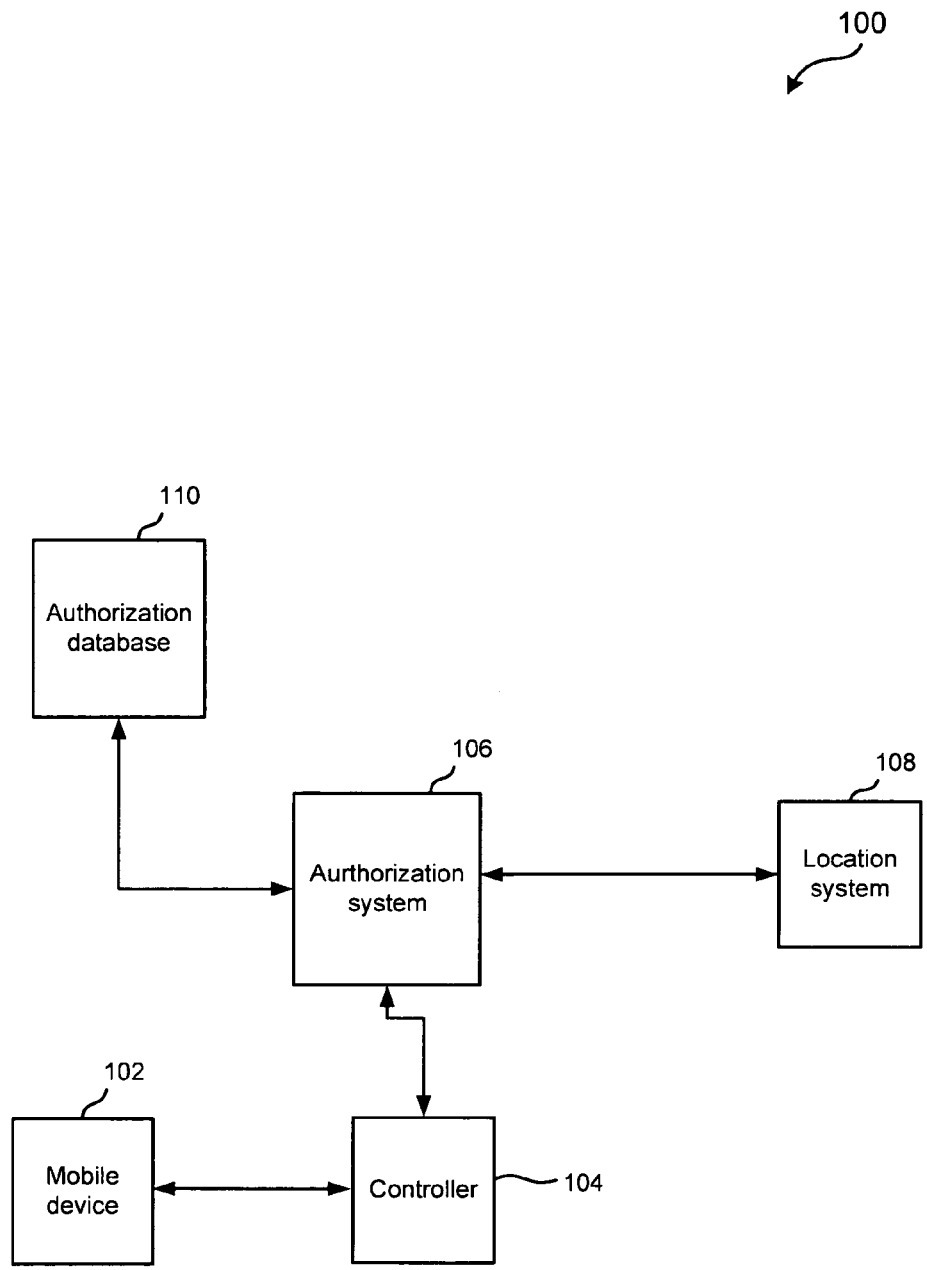
FIG. 1 depicts a simplified system for authorizing a mobile device according to one embodiment of the present invention.

FIG. 1 depicts a simplified system 100 for authorizing a mobile device according to one embodiment of the present invention. As shown, system 100 includes a mobile device 102, controller 104, authorization system 106, location system 108, and authorization database 110. Although these components are shown, it will be recognized that other components may be provided in system 100. Further, functions described in each of the components may be combined into other components.

Mobile device 102 may be any device configured to connect to controller 104. For example, mobile device 102 may be a cellular telephone, laptop computer, wireless router, soft phone, personal digital assistant (PDA), Blackberry device, etc.

Controller 104 may be a controller that is configured to control access to a network. For example, controller 104 may be a GAN controller. In one embodiment, mobile device 102 establishes a secure IP connection through a gateway to a server that is GAN controller 104, which may be on a carrier's network. GAN controller 104 translates signals coming from mobile device 102 to make it appear to be coming from another base station. Thus, when mobile device 102 moves from a WAN to a LAN, it appears to a core network that it is simply on a different base station.

Authorization system 106 is configured to authorize mobile device 102. Authorization system 106 authorizes a registration request from mobile device 102 to connect to a network. In one embodiment, authorization system 106 may be an authentication, authorization, and accounting (AAA) system.

In one embodiment, mobile device 102 may send a registration request for access to an access network. The access network connects mobile devices 102 to telecommunication service providers. It can be considered the route between the subscriber's home, and the ISP itself. In one embodiment, a generic access network (GAN)/unlicensed mobile access (UMA) network is used. Mobile devices 102 may access networks through a wide area network (WAN), such as a cellular network and/or a local area network (LAN), such as a WiFi network. The GAN/UMA network allows mobile device 102 to transition between the LANs and WANs. When mobile device 102 is detected on one of the networks, mobile device 102 needs to be authorized to determine if it can access the network.

Location system 108 is configured to provide location information. In one embodiment, location system 108 may include a map gateway and gateway mobile location center (GMLC). Location system 108 may take a location identifier and map it to static location information. The location identifier may be an identifier for a geographical area. Spatial coordinates for where the geographical area is located may then be determined. For example, mobile device 102 may connect to a base station. A cell ID may then be sent in a registration request. The cell ID may be a cell global index, which is an identifier for a cell in a network. The cell ID may be for geographic area covered by a base station in a cellular network. Spatial coordinates for the geographical area are then determined based on the cell ID.

In another embodiment, the location identifier may be an ATM Virtual Circuit (VC) identifier. In one such embodiment, mobile device 102 may recover the ATM VC information from its point of attachment (not shown in figure) and include this in its application registration request.

Location system 108 may map the location identifier to spatial coordinates. These spatial coordinates are static in that they do not have to change in authorization database 110, e.g., when cell IDs change for a cell in the same geographical area or when a network, such as an ATM network, is re-configured. The spatial coordinates may then be used to authorize mobile device 102. In one embodiment, location system 108 may be a legacy location system that is configured to determine spatial coordinates after authorization. However, embodiments of the present invention use the legacy system to determine the spatial coordinates before authorization. Because mobile devices 102 can attach to points of attachment in different locations in a GAN system, the spatial locations are used to authorize mobile devices 102.

Authorization database 110 includes authorization information that may be used to authorize whether mobile device 102 can connect to a network or not. Authorization system 106 uses the static location information in database 110 to determine the authorization the static location information does not change if changes are made to the location identifiers. For example, the location identifier may change. This may be because network providers may change cell IDs or any other identifiers for a network as the network is built out. Further, as new equipment is added to networks, different cell IDs may be used. However, the static location information used to authorize mobile device 102 does not change in authorization database 110. For example, if spatial coordinates are used to authorize mobile device 102, then no matter what cell ID is received, the spatial coordinates for that cell ID can be used to authorize mobile device 102.

Accordingly, embodiments of the present invention use the static location information to authorize a registration request from mobile device 102. A location identifier may be mapped to the static location information. The location identifier may be somewhat dynamic and may change over time. However, the location identifier is mapped to static location information that is used to authorize mobile device 102. Thus, operators do not need to change the static location information in authorization database 110 whenever networks are changed. This is convenient for operators as making many changes to an authorization database is not desirable. Also, a GAN system can use static location information that may be generated by a legacy location system.

Figure 2:
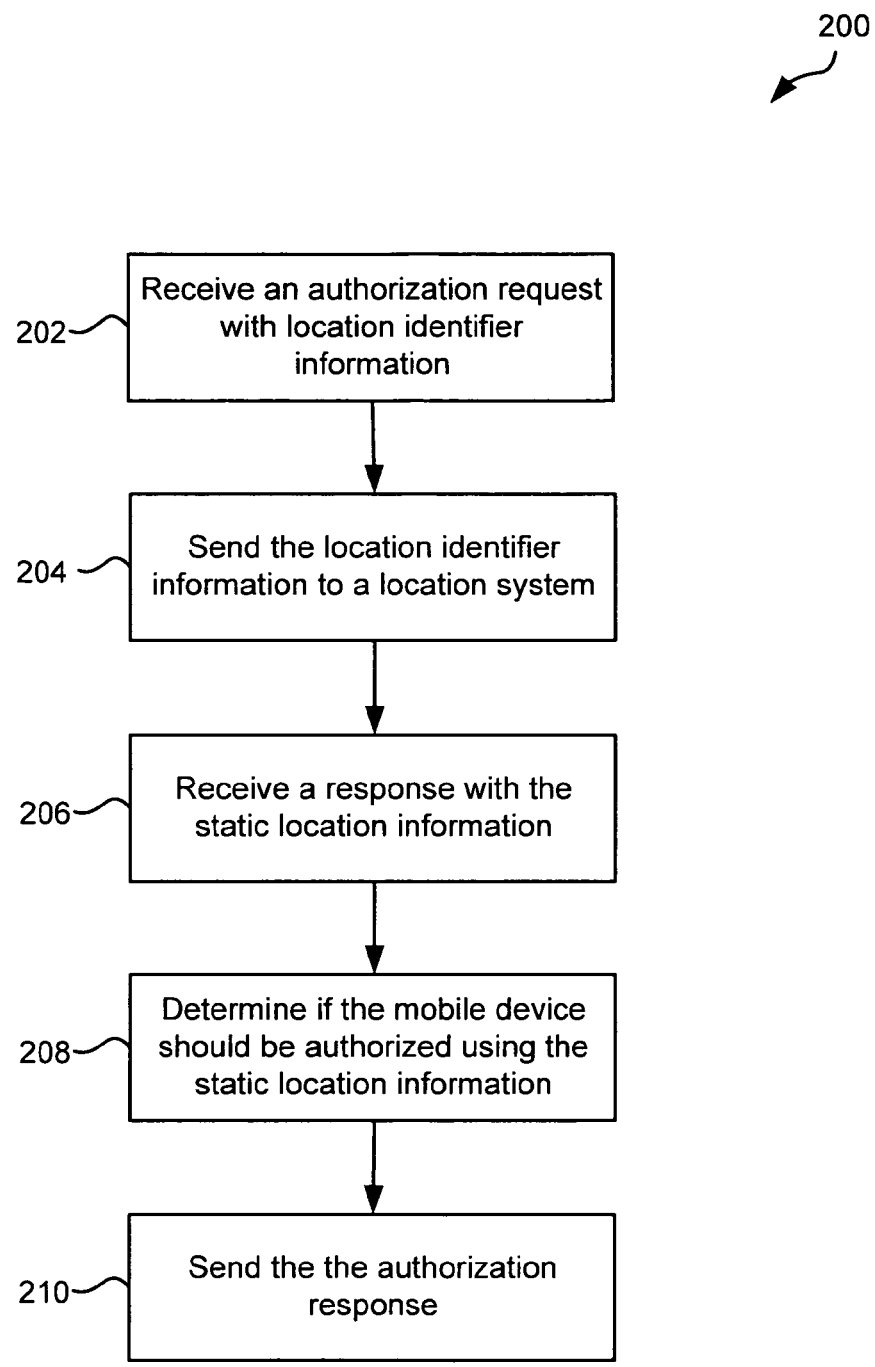
FIG. 2 depicts a simplified flow chart of a method for authorizing a mobile device according to one embodiment of the present invention.

FIG. 2 depicts a simplified flow chart 200 of a method for authorizing mobile device 102 according to one embodiment of the present invention.

In step 202, authorization system 106 receives an authorization request with location identifier information. For example, mobile device 102 may attempt to connect to a gateway. Controller 104 may receive the registration request and forward it to authorization system 106. In one embodiment, mobile device 102 may send the location identifier information to controller 104. The location identifier information may be a cell ID, such as the last known cell global index.

In step 204, authorization system 106 sends the location identifier information to location system 108. Location system 108 is then configured to map the location identifier information to static location information. In one embodiment, the cell ID is mapped to spatial coordinates. When a network is developed, the cell IDs may be mapped to spatial coordinates. Location system 108 has access to the mapping of cell IDs to location information. Thus, when a cell ID is received, location system 108 determines spatial coordinates for where the cell. ID is located.

As discussed above, the cell IDs may change, such as a number identifying the cell (e.g., a cell ID of 10 changes to 12). However, the mapping for the different cell IDs is always mapped to the same spatial coordinates if the geographical area for the cell ID is in the same location. Accordingly, the spatial coordinates are static if cell IDs are in the same spatial location. A Gateway Mobile Location Center (GMLC) is maintained by an operator and has location estimates based on Cell ID. This database is kept updated at all times, and can be queried to determine spatial coordinates prior to authorizing mobile device 102. The entity may change cell IDs but updates the GMLC when these cell IDs change.

In step 206, authorization system 106 receives a response with the static location information.

In step 208, authorization system 106 determines if mobile device 102 should be authorized using the static location information. In one embodiment, authorization system 106 may communicate with authorization database 110 to determine if mobile device 102 should be authorized for the location it is in. In one embodiment, spatial coordinates are used to determine if mobile device 102 is allowed to access a network in that geographical location. For example, for each mobile device 102, certain spatial coordinates may be included in authorization database 110. If the spatial coordinates determined for the cell ID are in a location in which mobile device 102 can access the network, then mobile device 102 is authorized.

In step 210, the authorization response is sent. A response may deny or allow the registration. Further, attributes for the authorizations may be included, such as a level of access. For example, based on the spatial coordinates, different authorizations may be determined. For example, mobile device 102 may have a first level of access in a first location and a second level of access in a second location.

Figure 3:
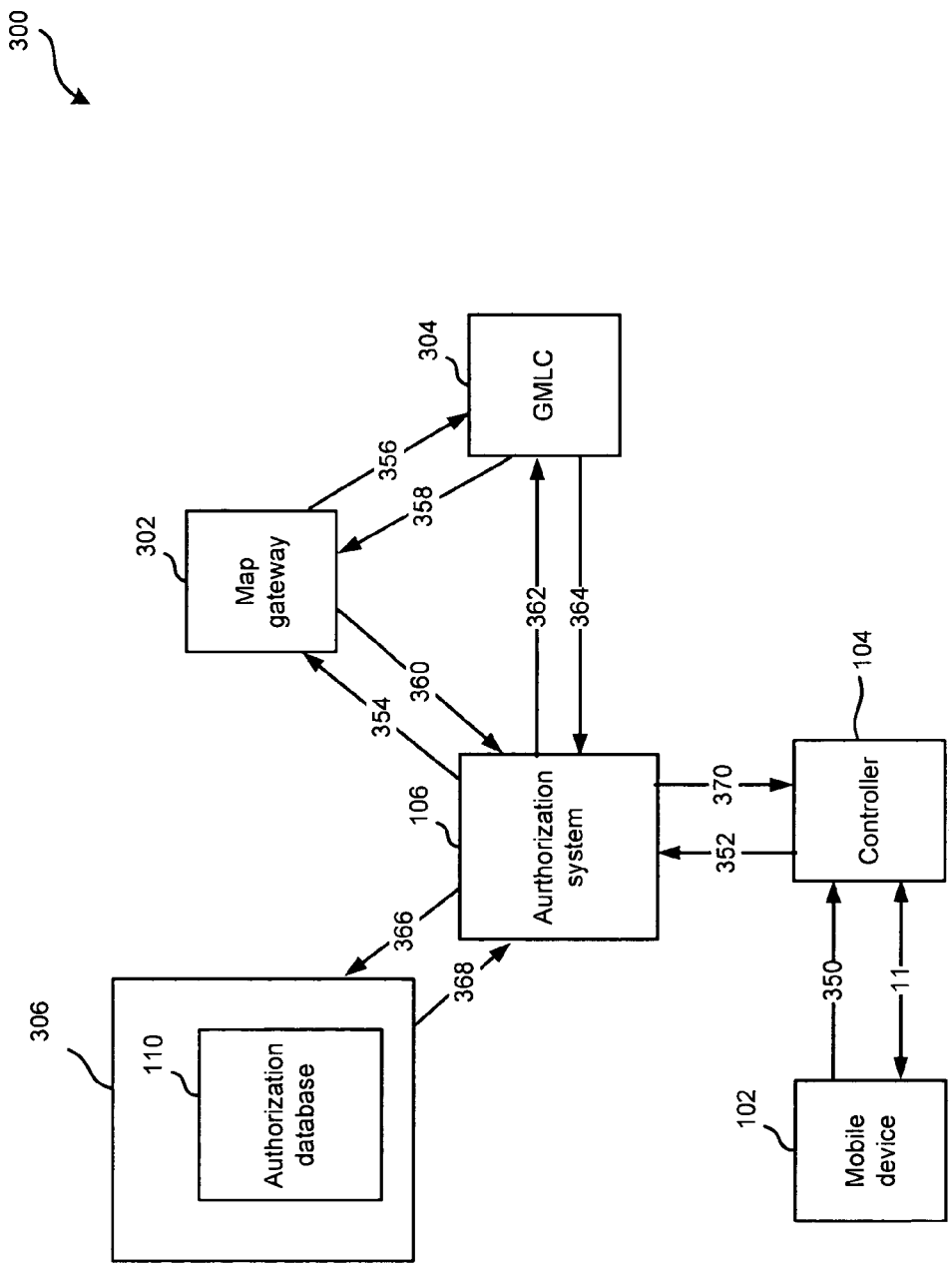
FIG. 3 depicts a more detailed embodiment of the system according to embodiments of the present invention.

FIG. 3 depicts a more detailed embodiment of system 100 according to embodiments of the present invention. At 350, mobile device 102 sends a registration request to GAN controller 104. The registration request may include a cell ID and an international mobile subscriber identity (IMSI). The IMSI is a unique number that is associated with mobile device 102.

At 352, GAN controller 104 sends an authorization request to authorization system 106. The authorization request may include the IMSI, cell ID, and also an IP address for mobile device 102. The IP address may have been determined for mobile device 102 upon registration. In one embodiment, during registration, authorization system 106 associates the IMSI with the IP address that was allocated.

At 354, authorization system 106 sends a request that includes the IMSI, IP address, and cell ID to a map gateway 302.

Map gateway 302 is configured to issue a map subscriber location report message. This is sent to a GMLC 304 at 356. GMLC 304 is configured to support location services. The map subscriber location report message includes the cell ID and the IMSI. At 358, GMLC 304 sends a confirm message to map gateway 302, which is then forwarded to authorization system 106 at 360. The subscriber location report message sent to GMLC 304 allows authorization system 106 to request the static location information using the IMSI.

At 362, authorization system 106 sends a location request with the IMSI to GMLC 304. When GMLC 304 receives the location request with the IMSI, it determines the cell ID that was sent in the map subscriber location report message based on the IMSI. GMLC 304 then maps the cell ID to static location information, such as spatial coordinates. In one embodiment, the Gateway Mobile Location Center (GMLC) implements functionalities required to support the Location Services LCS. In one network, there may be more than one GMLC. Each GMLC is the first node for the accesses of an external Location Services Client (LCS Client) in a mobile network. The GMLC may request routing information from a global register-Home Location Register (HLR) or Home Subscriber Server (HSS)—of the subscribers of the operator. Furthermore the GMLC contains information allowing it to perform authentication and authorization activities of external LCS Client entities requiring location of mobile devices 102. After having obtained the routing information and performed the authorization and authentication activities of the external LCS Clients, the GMLC sends the location request to the Mobile Switching Center/Visitor Location Register (MSC/VLR) or Serving GPRS Support Node (SGSN) and receives information about the geographic coordinates of mobile device 102 whose location has been requested from the corresponding entities. Thus, a GAN system is integrated into the legacy location services system by querying for the static location information.

At 364, GMLC 304 sends a location response with the static location information. Authorization system 106 can now determine if mobile device 102 should be authorized or not. At 366, an authorization request is sent. The authorization request includes the IMSI and also static location information. The authorization database 110 may be located in a server 306 or any other device. When the authorization request is received, the static location information is looked up in authorization database 110 to determine if mobile device 102 should be authorized. For example, the IMSI may be indexed with coordinates. If the spatial coordinates sent in the authorization request are coordinates that the IMSI is authorized for, then the authorization may be approved. At 368, an authorization response is sent to authorization system 106.

At 370, the authorization response is sent to GAN controller 104. GAN controller 104 may then send a registration accept or reject message at 372.

Figure 4:
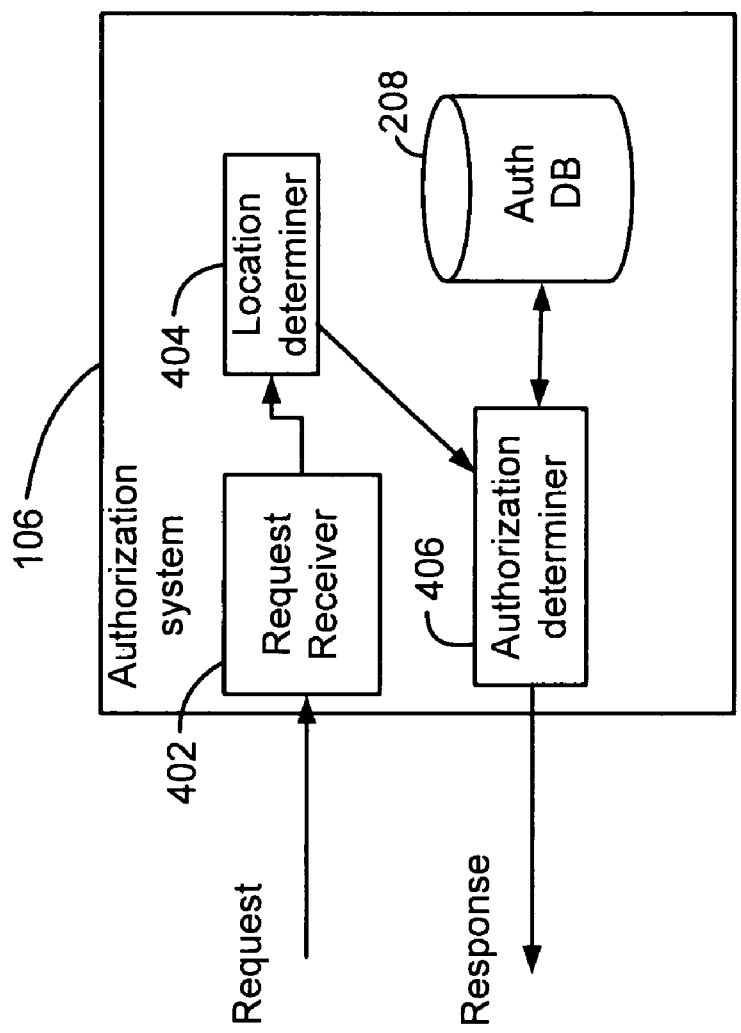
FIG. 4 depicts a more detailed embodiment of an authorization system according to one embodiment of the present invention.

FIG. 4 depicts a more detailed embodiment of authorization system 106 according to one embodiment of the present invention. As shown, authorization system 106 includes a request receiver 402, a location determiner 404, and an authorization determiner 406.

Request receiver 402 receives a request for authorization of mobile device 102 to access a network. The request includes a mobile device identifier for mobile device 102 and a location identifier.

Location determiner 404 uses the location identifier to determine static location information. For example, spatial coordinates may be determined from the location identifier.

Authorization determiner 406 then uses the mobile device identifier and static location information to determine if mobile device 102 should be authorized to access the network. For example, the mobile device identifier may be associated with certain spatial coordinates that it can be authorized for. For example, if mobile device 102 is accessing a network in a location that it is authorized, then the request may be authorized.

In one example, a mobile device such as a cellular phone may be moved to a location. The cellular phone then attempts to connect to an access network. An authorization database includes spatial coordinates for the cellular phone where the cellular phone is allowed to access a network.

When the registration request is received, a location identifier is sent. This identifier may be for a cell in a network. The location identifier may have changed multiple times since the spatial coordinates in the authorization database were stored. However, the location identifier is mapped to spatial coordinates and used to authorize the cellular phone. Thus, the cellular phone can be authorized even though the location identifier changes.

Accordingly, mobile device 102 is authorized based on static location information. This static location information does not need to be changed in authorization database 110 when cell re-planning occurs in a network. This is useful because cell IDs are often changed during network development.

Although the invention has been described with respect to specific embodiments thereof, these embodiments are merely illustrative, and not restrictive of the invention. Although a GAN/UMA network is described, it will be understood that any network may be used.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:
1. A method for authorizing a mobile device, the method comprising:
storing authorization static location information for an authorization geographical area, the authorization static location information comprising spatial coordinates and being used for authorizing the mobile device;
receiving a registration request for the mobile device for requesting access to a network, the registration request including a first cell identifier for a geographical area;
determining static location information for the geographical area based on a mapping from the first cell identifier, wherein the determined static location information comprises spatial coordinates that do not change when a second cell identifier is used instead of the first cell identifier for the geographical area, the second cell identifier also being mapped to the determined static location information;
authorizing the registration request using the determined static location information for the geographical area and the stored authorization static location information for the mobile device, wherein the mobile device is authorized when either the first or the second cell identifier is included in the registration request; and
sending a response to the registration request based on the authorization, the response indicating whether access to the network is authorized for the mobile device.

2. The method of claim 1, wherein when the first cell identifier changes to the second cell identifier, the authorization static location information does not change for the mobile device even if the second cell identifier is for a different geographic location from that of the first cell identifier.

3. The method of claim 1, wherein the determining static location information comprises:
sending a request to a location service for mapping each of the first and second cell identifiers to the static location information; and
receiving a response with the determined static location information.

4. The method of claim 1, further comprising sending a mobile device identifier for the mobile device, wherein the mobile device identifier is used to authorize the registration request using the determined static location information.

5. The method of claim 1, further comprising:
sending each of the first and second cell identifiers and an identifier for the mobile device to a map gateway, the map gateway issuing a subscriber location report to a location service;

sending the identifier for the mobile device to the location service; and receiving the determined static location information in response to the sending the mobile device identifier to the location service.

6. The method of claim 1, wherein the network comprises an unlicensed mobile access (UMA)/generic access network (GAN) network.

7. A method for authorizing a mobile device, the method comprising:

sending, from the mobile device, a registration request for requesting access to a network, the registration request including a first cell identifier for a geographical area; and receiving a response to the registration request, the response including an indication as to whether the mobile device is authorized to access the network, the authorization being determined using static location information for the geographical area that is determined based on a mapping from the first cell identifier to stored authorization static location information for the mobile device, wherein the determined static location information comprises spatial coordinates that do not change when a second cell identifier is used instead of the first cell identifier for the geographical area, the second cell identifier also being mapped to the determined static location information, wherein the mobile device is authorized when either the first or the second cell identifier is included in the registration request.

8. The method of claim 7, further comprising sending a mobile device identifier for the mobile device, wherein the mobile device identifier is used to determine the authorization based on the determined static location information.

9. The method of claim 7, wherein the network comprises an unlicensed mobile access (UMA)/generic access network (GAN) network.

10. An apparatus configured to authorize a mobile device, the apparatus comprising:

one or more computer processors; and a memory containing instructions that, when executed by the one or more processors, cause the one or more computer processors to perform a set of steps comprising:

storing authorization static location information for an authorization geographical area, the authorization static location information comprising spatial coordinates and being used for authorizing the mobile device;

receiving a registration request for the mobile device for requesting access to a network, the registration request including first cell identifier for a geographical area;

determining static location information for the geographical area based on a mapping from the first cell identifier, wherein the determined static location information does not change when a second cell identifier is used instead of the first cell identifier for the geographical area, the second cell identifier also being mapped to the determined static location information;

authorizing, by the one or more computer processors, the registration request using the determined static location information for the geographical area and the stored authorization static location information for the mobile device, wherein the mobile device is authorized when either the first or the second cell identifier is included in the registration request; and sending a response to the registration request based on the authorization, the response indicating whether access to the network is authorized for the mobile device.

11. The apparatus of claim 10, wherein when the first cell identifier changes to the second cell identifier, the determined static location information remains the same for the changed cell identifier even if the second cell identifier is for a different geographic location from that of the first cell identifier.

12. The apparatus of claim 10, wherein the instructions cause the one or more computer processors to perform further steps comprising:

sending a request to a location service for mapping each of the first and second cell identifiers to the static location information; and receiving a response with the determined static location information.

13. The apparatus of claim 10, wherein the instructions cause the one or more computer processors to perform a further step comprising:

sending a mobile device identifier for the mobile device, wherein the mobile device identifier is used to authorize the registration request using the determined static location information.

14. The apparatus of claim 10, wherein the instructions cause the one or more computer processors to perform further steps comprising:

sending each of the first and second cell identifiers and an identifier for the mobile device to a map gateway, the map gateway issuing a subscriber location report to a location service;

sending the identifier for the mobile device to the location service; and receiving the determined static location information in response to sending the mobile device identifier to the location service.

15. The apparatus of claim 10, wherein the network comprises an unlicensed mobile access (UMA)/generic access network (GAN) network.

16. A mobile device, comprising:

one or more computer processors; and a memory containing instructions that, when executed by the one or more processors, cause the one or more computer processors to perform a set of steps comprising:

sending, from the mobile device, a registration request for requesting access to a network, the registration request including a first cell identifier for a geographical area; and receiving a response to the registration request, the response including an indication as to whether the mobile device is authorized to access the network, the authorization being determined using static location information for the geographical area that is determined based on a mapping from the first cell identifier to stored authorization static location information for the mobile device, wherein the determined static location information comprises spatial coordinates that do not change when a second cell identifier used instead of the first cell identifier for the geographical area, the second cell identifier also being mapped to the determined static location information, wherein the mobile device is authorized when either the first or the second cell identifier is included in the registration request.

17. The mobile device of claim 16, wherein the instructions cause the one or more processors to perform a further step comprising:

sending a mobile device identifier for the mobile device, wherein the mobile device identifier is used to determine the authorization based on the determined static location information.

18. The mobile device of claim 16, wherein the network comprises an unlicensed mobile access (UMA)/generic access network (GAN) network.

19. An apparatus configured to authorize a mobile device, the apparatus comprising:
   means for storing authorization static location information for an authorization geographical area, the authorization static location information comprising spatial coordinates and being used for authorizing the mobile device;
   means for receiving a registration request for the mobile device for requesting access to a network, the registration request including a first cell identifier for a geographical area;
   means for determining static location information for the geographical area based on a mapping from the first cell identifier, wherein the determined static location information comprises spatial coordinates that do not change when a second cell identifier is used instead of the first cell identifier for the geographical area, the second cell identifier also being mapped to the determined static location information;
   means for authorizing, by one or more computer processors, the registration request using the determined static location information for the geographical area and authorization static location information for the mobile device, wherein the mobile device is authorized when either the first or the second cell identifier is included in the registration request; and
   means for sending a response to the registration request based on the authorization, the response indicating whether access to the network is authorized for the mobile device.

20. A mobile device, comprising:
   means for sending, from the mobile device, a registration request for requesting access to a network, the registration request including a first cell identifier for a geographical area; and
   means for receiving a response to the registration request, the response including an indication as to whether the mobile device is authorized to access the network, the authorization being determined using static location information for the geographical area that is determined based on a mapping from the first cell identifier to stored authorization static location information for the mobile device, wherein the determined static location information comprises spatial coordinates that do not change when a second cell identifier is used instead of the first cell identifier for the geographical area, the second cell identifier also being mapped to the determined static location information, wherein the mobile device is authorized when either the first or the second cell identifier is included in the registration request.

* * * * *